A. L. & F. L. HATCH.
Milk Cans.
No. 4,781.
Reissued March 5, 1872.
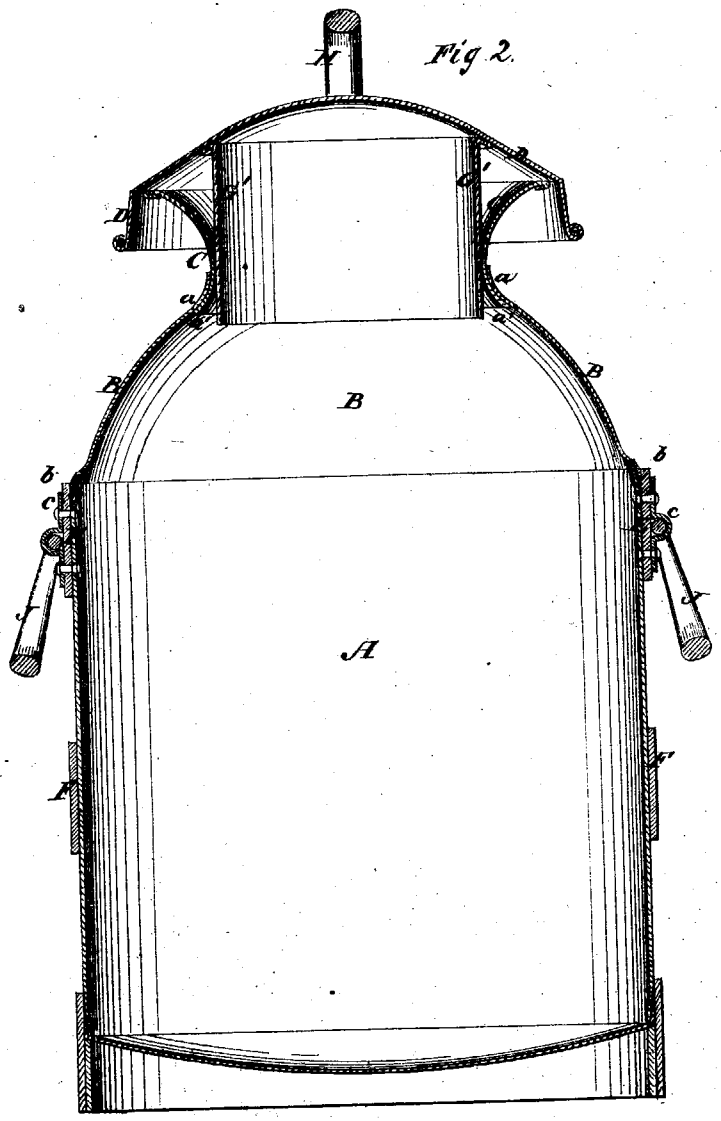
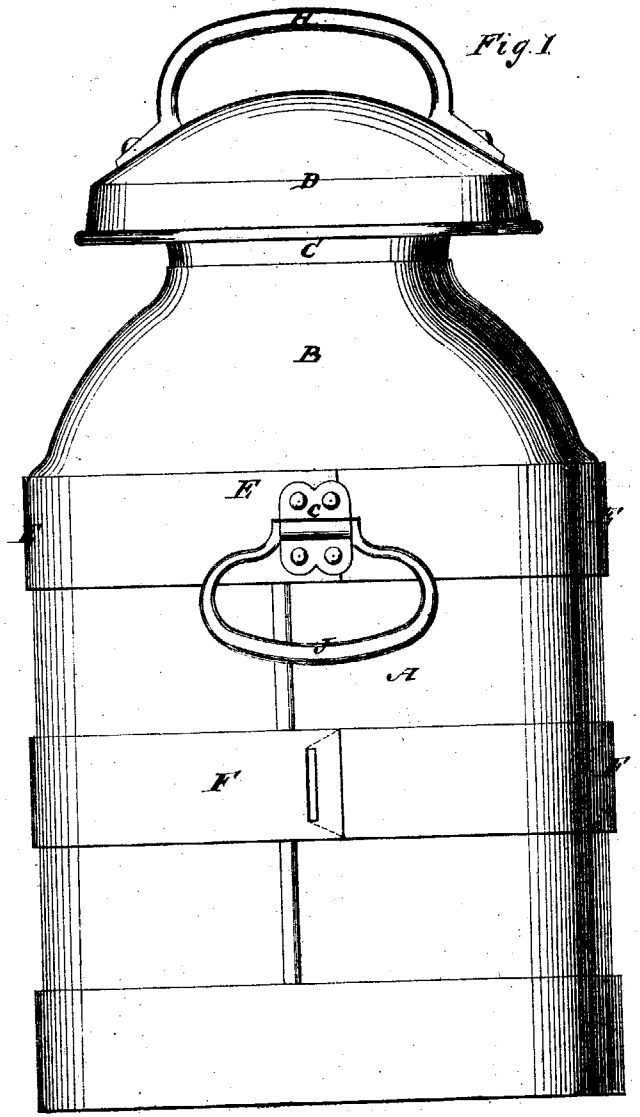
Witnesses:
M. M. Thompson
T. B. Bucher
Alvand L. Hatch
Francis L. Hatch
AM. PHOTO-LITHOGRAPHIC CO. N.Y. (OSBORNE'S PROCESS.)

UNITED STATES PATENT OFFICE.

ALMOND L. HATCH, OF ELIZABETH, AND FRANCIS L. HATCH, OF NEWARK, NEW JERSEY, ASSIGNEES OF PHILIP TEETS, OF NEW YORK CITY.

IMPROVEMENT IN MILK-CANS.

Specification forming part of Letters Patent No. 32,439, dated May 28, 1861; reissue No. 4,781, dated March 5 1872.

*To all whom it may concern:*

Be it known that PHILIP TEETS, of the city of New York, in the State of New York, heretofore invented certain new and useful Improvements in Milk-Cans; and that the following is a full, clear, and exact description of the same, reference being had to the drawing which accompanies and forms part of this specification.

The breast portion and bowl, as well as the covers, of milk-cans have heretofore been made each of a number of pieces of metal soldered together, thereby making a great number of joints or seams in the construction of each of these parts, aside from the joints made in connecting these parts together to produce the can. This mode of construction rendered the cans quite difficult to thoroughly cleanse day by day, which it is necessary to do, else the milk lodging in any joint will sour and infect the whole of the milk when the can is refilled; and, moreover, the greater the number of the joints, the more injury the can receives from the rough usage to which it is subjected in its transportation back and forth by railroad. It is, therefore, desirable to construct the several parts of a milk-can with the least possible number of seams or joints, and thereby cheapen the cost of manufacture, and render the cans stronger and more durable.

This invention consists in a seamless breast for a milk-can, made of a single piece or sheet of metal by stamping it up in the desired shape by suitable dies, and adapted to be properly secured to the body of the milk-can; it also consists in a bowl and cover for a milk-can, of similar construction; it also consists in the combination, with the body of a milk-can, of a seamless breast, and bowl, and cover, either or all, in a single can; it further consists in the method of connecting the breast with the body of the can by means of a double-seam joint covered by a hoop, whereby a firm water-tight union of the two parts is effected; it further consists in the new article of manufacture of a milk-can, which, as a whole, is of a new and improved construction.

In the accompanying drawing, Figure 1 is a side elevation of a milk-can embodying in its construction these several improvements. Fig. 2 is a vertical longitudinal central section of the same.

A designates the body of the can; B, the breast; C, the bowl; and D, the cover, all of which parts are, in the case of the larger sizes of cans, preferably, composed of thick tinned iron—a kind usually made expressly for use in the manufacture of large milk-cans. The body A of the can is made in the usual or any suitable manner, and provided with a bottom, K, and strengthing-hoops F G, as usual. The breast B is made of a single piece, preferably a circular piece, of sheet metal, stamped by suitable dies into the required shape, as will be clearly understood by reference to the drawing, where it will be seen that the said breast is provided with an upwardly-projecting portion or flange at its top, which flange is thrown up at a greater or less angle to the main portion of the said breast, and which is adapted to receive and have properly secured to it the neck or bowl of the can. The bowl C is also formed of a piece of sheet metal by submitting the same to the action of stamping-dies of the proper shape to give the flaring form to the ends of the bowl. The upper edge of the bowl is preferably wired, or bent over a wire, for strengthening and giving a finished appearance to the mouth of the can. To unite the bowl to the breast, the lower end of the bowl is introduced for a suitable distance into the upper end of the breast B, and the two soldered together. The overlapping edges *a a* are then filed down so as to present a smooth surface at this joint inside and outside of the can, to facilitate the cleansing of the same. It will therefore be perceived that this improvement permits the hooped neck hitherto employed between the bowl and breast to be entirely dispensed with, and thereby a very considerable saving is effected in the manufacture of milk-cans, besides uniting the breast and bowl by a tight smooth joint. In uniting the breast with the body it is desirable to provide the lower end of the breast with a wide flange, and the upper end of the body A, also, with a flange, the two flanges being brought together, so that the one rests upon the other; they are then turned over so as to form what is called a double-seam joint, and this joint is pressed against the body A of the can, as will be understood by reference to Fig. 2. It will be noticed, by reference to Fig. 2, that, when the breast and body are thus connected together, the flange upon the breast becomes a downwardly-projecting rim, *b*, which laps upon the body A. A strong tinned-iron hoop, E, may be driven down over the said seam or joint, and properly soldered in place, and thereby make a perfectly liquid-tight joint between the breast and body of the can. The cover D is also made of a single piece of sheet metal, which is given the desired form by stamping-dies. To the under side of the cover a rim, G′, is secured, which rim is of sufficient length to pass down into the neck or bowl of the can, and therefore steady the cover on the can, and prevent the milk from splashing out. In making covers for milk-cans, the practice heretofore has been to make the top part of the cover of one or more pieces of metal, united together by seams, and then to secure to this top piece a hoop, which would form the downwardly-projecting sides of the cover. It will be seen that seams and joints are entirely dispensed with, and that an entire cover is produced of a single seamless and jointless piece of sheet metal. The cover D may be provided with handles H, and so, also, may the body of the can be provided with handles J J, which latter it is desirable to attach to the hoop E by eyes *c c*, as shown in the drawing. The bottom K is provided with a rim, *d*, which, in the present instance, overlaps the lower end of the body A, where the two parts are soldered together. The ordinary iron or strengthening hoop L is shown as employed, in connection with the hoop G, for strengthening the base of the can.

By thus providing a seamless breast and bowl and cover for a milk-can, a great decrease in the cost of manufacture of milk-cans is effected, besides the production of a much better and more desirable and durable article, and one which can be thoroughly and easily cleansed internally as well as externally.

Having thus described the invention of the said PHILIP TEETS, what is claimed as new, and desired to be secured by Letters Patent, is—

1. The new article of manufacture of a seamless breast for a milk-can, stamped up by suitable dies from a single sheet or piece of metal, substantially as herein specified, and adapted to be properly secured to the body of a milk-can, and provided with an upwardly-projecting portion or flange for receiving the neck or bowl of the can.

2. A seamless breast having an upwardly-projecting neck or bowl-flange, combined with the cylinder or body of a milk-can, substantially as herein specified.

3. The combination, with the breast and body of a milk-can, of a seamless bowl, constructed substantially as herein specified.

4. The combination, with the body, breast, and bowl of a milk-can, of a seamless cover, substantially as herein specified.

5. The new article of manufacture of a milk-can, made, as a whole, substantially as herein shown and described.

ALMOND L. HATCH.
FRANCIS L. HATCH.

Witnesses:
M. M. LIVINGSTON,
T. B. BEECHER.